United States Patent [19]
Shatas et al.

[11] Patent Number: 5,465,105
[45] Date of Patent: Nov. 7, 1995

[54] AUTOSENSING SWITCHING SYSTEM

[75] Inventors: Remigius G. Shatas, Huntsville; David L. Ligon, Athens, both of Ala.

[73] Assignee: Cybex Corporation, Huntsville, Ala.

[21] Appl. No.: 129,772

[22] Filed: Sep. 29, 1993

Related U.S. Application Data

[63] Continuation-in-part of Ser. No. 488,710, Mar. 5, 1991, Pat. No. 5,268,676, which is a continuation-in-part of Ser. No. 477,010, Dec. 5, 1989, Pat. No. 5,193,200, which is a continuation-in-part of Ser. No. 95,140, Sep. 11, 1987, Pat. No. 4,885,718.

[51] Int. Cl.$^6$ .............................. G09G 1/00; G09G 5/00
[52] U.S. Cl. ................................................... 345/204
[58] Field of Search ................................. 345/1–3, 204; 395/325

[56] References Cited

FOREIGN PATENT DOCUMENTS 59-165135  9/1984  Japan ........................................ 345/2

*Primary Examiner*—Jeffery Brier
*Attorney, Agent, or Firm*—C. A. Phillips

[57] ABSTRACT

An automatic signal switching system is provided having a plurality of communications links, each link having at one end a plurality of conductors terminating in a plug configured to be uniquely couplable to a particular source of computer video and related signals. The opposite end of each link is provided with a connector having terminals coupled to respective conductors in a standardized arrangement. This connector is coupled to sensing circuitry for sensing the particular type of computer signals, with the computer signals being provided as an output appropriately configured for that particular type of computer signal. The particular types of signals are applied to analog and digital buffers, which are selectively enabled to pass the computer video signals.

13 Claims, 4 Drawing Sheets

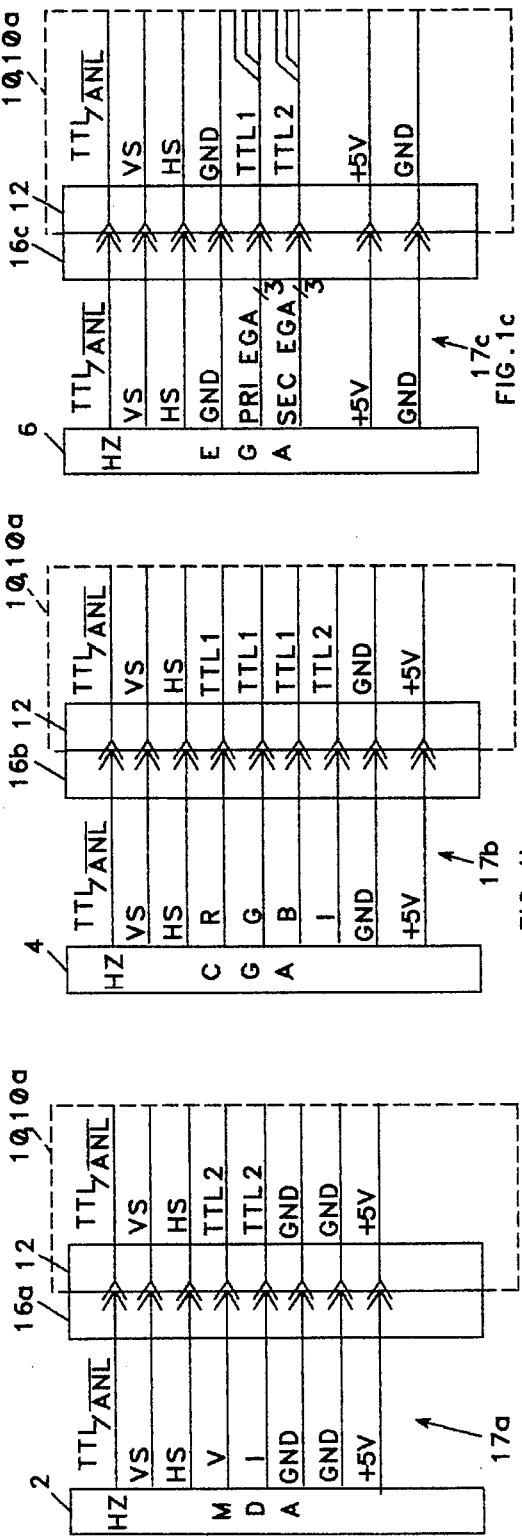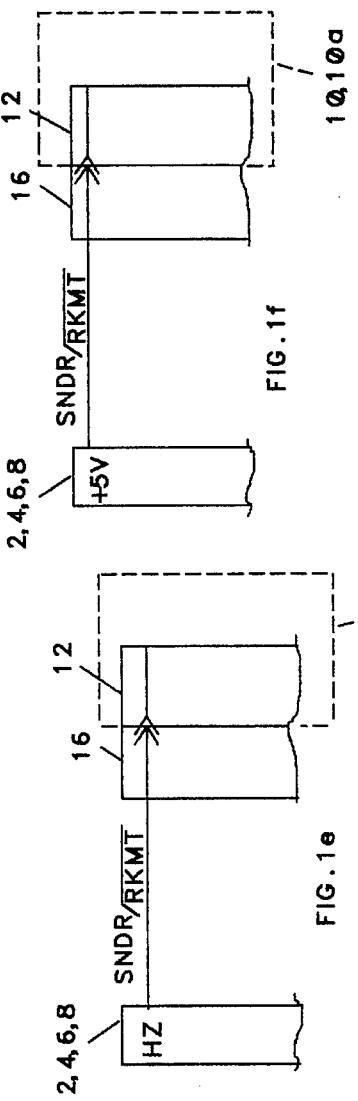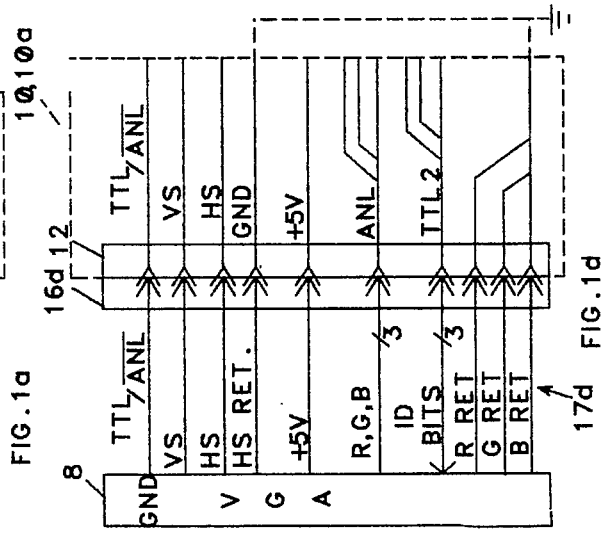

AUTOSENSING SWITCHING SYSTEM

CROSS REFERENCE TO RELATED APPLICATION

This application is a continuation-in-part of application Ser. No. 07/488,710, filed Mar. 5, 1991, now U.S. Pat. No. 5,268,676, which is a continuation-in-part of Ser. No. 477, 010, filed Dec. 5, 1989, now U.S. Pat. No. 5,193,200, which is a continuation-in-part of Ser. No. 095,140, filed Sep. 11, 1987, now U.S. Pat. No. 4,885,718.

FIELD OF THE INVENTION

This invention relates to coupling of different types of computer signals to appropriate peripheral devices, and particularly to a system wherein identification signals and particular cabling configurations enable circuitry to pass a particular type of discrete signals.

BACKGROUND OF THE INVENTION

With respect to microcomputer video signals and transmission thereof, one early protocol of standardized video transmission is the MDA (monochrome display adapter) protocol that provides monochrome video and sync signals to a monochrome monitor. In this scheme, a 9 terminal, subminature "D" connector is mounted on the computer for coupling the MDA signals to a monitor. Of these terminals, terminals 1 and 2 are connected to logic ground, and terminals 3, 4, and 5 are not used. Terminal 6 provides the intensity signal, terminal 7 provides the video signal, and terminals 8 and 9 provide the horizontal and vertical sync signals (HS, VS), respectively. The video and sync signals are TTL level signals that swing from a HIGH of at least 2.4 volts down to a LOW of at least 0.6 volts.

Another early scheme is the CGA (color graphics adapter) protocol. Here, the computer is again provided with a 9 terminal, subminature "D" type connector, with terminals 1 and 2 being coupled to logic ground. Terminals 3, 4, and 5 carry the red, green, and blue video signals, respectively, with terminal 6 carrying the intensity signal. Terminal 7 is reserved, or not used, and terminals 8 and 9 carry the horizontal and vertical sync signals, respectively. These CGA video signals are also digital TTL level signals.

An enhanced version of the CGA scheme emerged, known as EGA (enhanced graphics adapter), which, while still using TTL video signals, provided better quality color video. This scheme called for the computer to have a subminature "D" connector having 9 terminals, with terminal 1 coupled to logic ground. Terminals 3, 4, and 5 carry the primary video signals red, green, and blue, respectively, and terminals 2, 6, and 7 carry the secondary video signals red, green, and blue, respectively. Terminals 8 and 9 carry the horizontal and vertical sync signals, respectively. As with the above protocols, these EGA signals are digital TTL signals.

A later development in computer video interface signals is the VGA (video graphics adapter) protocol, which uses a 15 terminal, high density (HDD) "D" connector mounted to the computer for providing the VGA signals. Here, terminals 1, 2, and 3 carry the red, green, and blue video signals, and terminals 6, 7, and 8 carry return potentials of the red, green, and blue signals, respectively. Terminals 13 and 14 carry the horizontal and vertical sync signals, respectively, with terminal 10 being a sync return for the vertical and horizontal sync signals. The terminal 8 position is a keyed position having no terminal therein, and terminals 5 and 15 are reserved, or not connected. Terminals 11, 12, and 4 carry identification potentials from the monitor that indicate to the computer the type of VGA monitor; monochrome, color or high resolution, that is coupled to the computer. In contrast to the TTL protocols described above, the VGA video signals red, green, and blue are analog signals having a swing of from about 0–700 millivolts, with the horizontal and vertical sync signals and identification signals still being TTL levels. In all of the described schemes, the outer, metallic shield encasing the connector, and the braided shield encasing the transmission cable are coupled to chassis ground.

There are three methods used to input the various types of video formats used by PC type computers. The most common is to use a cable and circuitry tailored specifically to each type or class of video signals. This approach is used by CYBEX Corporation, of Huntsville, Ala., in their original manual COMMANDER™ keyboard and video switch. This method is also used by ROSE ELECTRONICS™ of Houston, Tex., in their manual keyboard and video switch, and by RARITAN COMPUTERS, INC ™, of Belle Meade, N.J.

The major drawback of these systems of the prior art is that as computer systems are upgraded to include computers having a different class of video signals, the cables and electronics must be replaced due to the fact that they are only capable of handling one type of video signal.

Another method of coupling various TTL classes of video signals to analog computers is employed by RARITAN COMPUTERS Inc.™. Here, an adapter is connected between the TTL video outputs and the analog input, which adapter converts the TTL signals to analog signals prior to inputting the signals to an analog switching network.

The disadvantage here is that a standard MDA, CGA, EGA or VGA monitor cannot be used because the horizontal and vertical frequencies and signal timing between TTL and VGA classes of video signals, and even between MDA and CGA/EGA types of video signals are not compatible. In this instance, a more sophisticated, expensive, multisynchronous monitor must be used as a display device. However even with this more sophisticated monitor, depending upon the quality of the monitor, manual adjustment of the position of the image and borders may be required.

The third method is to use cables which couple to the TTL or VGA output of the computer at one end and which are connected at the other end to the electronics via a single connector, the circuit card being configurable with jumpers for each respective video type, such as in the AUTOBOOT COMMANDER ™, introduced by CYBEX CORPORATION, in 1990. A similar product was introduced by ROSE ELECTRONICS in 1992 which did not require configuration by jumpers, but which used separate terminal connections for TTL and analog video signals, with common terminals for the horizontal and vertical sync signals of the various classes of video signals.

However, with the implementation used by ROSE ELECTRONICS, there are insufficient terminals provided in the keyboard and video switch input terminals to carry all the analog signal lines, such as the ID bits and two of the three secondary color lines of the EGA type signals to the electronics. This may result in an incorrect display when using computers having an EGA class output, and may cause initialization failures of some types of computers providing VGA outputs.

The prior art AUTOBOOT COMMANDER is the only instance known by Applicants where the video and keyboard connectors are coupled to a single connector that meets the requirements of the MDA, CGA, EGA, and VGA classes of computer signals. Here, the switching unit receives video signals, keyboard signals, and if used, mouse signals from the respective ports of up to eight computers and couples the ports of one of these computers to a single monitor, keyboard, and mouse. Each of the computers is coupled to a separate circuit card, called a "channel card", within the COMMANDER unit, with each channel card controlled by a microprocessor. As such, up to 12 COMMANDER units may be coupled together to form a system containing up to 96 microcomputers, the microcomputers typically being linked together by a networking scheme. The channel cards may each be manually configured by manipulation and setting of multiposition connectors known as "jumpers", or alternately, setting DIP switches, to configure each channel card to accept signals of one of the aforementioned video protocols.

However, manually configuring these channel cards is not an easy task, as first the computer system must be shut down, disrupting computer service to the users for the period of time necessary to reconfigure the channel card/cards. The COMMANDER unit must then be disconnected from the computers and peripheral devices, disassembled to gain access to the channel cards, and the instruction manual studied in order to ascertain which jumpers to place in what positions. After the jumpers on the channel card/cards are reconfigured, the unit must then be reassembled, and then reconnected to the computers and peripheral devices. Lastly, the system must be energized, or "booted", restoring service to the users. As there are 18 video jumpers on each card, this procedure may take up to an hour or so, depending on the skill level of the individual performing this operation.

More problems arise where different protocols of video signals are present, as where a number of CGA/EGA computers were initially installed in a computer system, and then the system expanded to include VGA computers. With the addition of each type new types of computers, it may be necessary to reconfigure channel card as described, with the necessary time spent to accomplish this task resulting in the attendant disruption of computer services.

Accordingly, it is an object of this invention to eliminate the need to manually configure electronic components for specific tasks or operations. This is achieved by the use of video identification signals and particular cabling configurations that automatically configure switching circuitry that provide the signals as outputs, greatly reducing the time spent installing a discrete computer or computers in a computer system.

SUMMARY OF THE INVENTION

A selective video transmission system is provided wherein a plurality of first communications links are uniquely couplable to one of a plurality of sources of video signals of diverse classes, with certain conductors in each first link dedicated to transmission of a particular class of video signals. A second communications link is connectable to each of the first communications links and has conductors for passing the diverse classes of video signals along discrete conductive paths. The system includes an indicating signal for indicating which class of the classes of video signals is applied to the first communications link, and a switch connected to the conductive paths of the second communications link and responsive to the indicating signal for switching the class of video signals coupled to the second communications link to an output conductive path.

BRIEF DESCRIPTION OF THE DRAWINGS

FIGS. 1a–1f are particular configurations of cabling and plug configurations of the present invention.

DETAILED DESCRIPTION OF THE DRAWINGS

Figure 1:
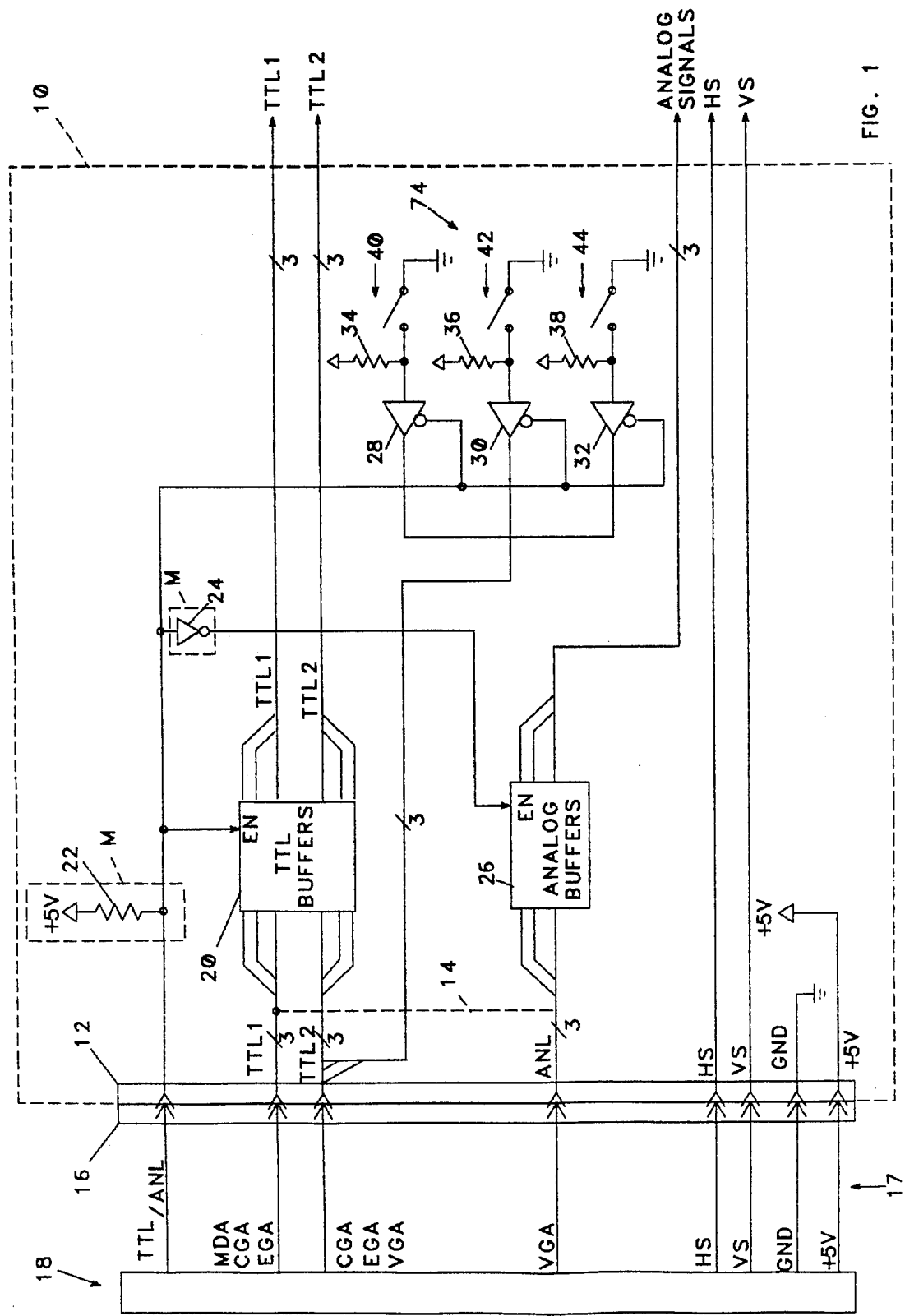
FIG. 1 is a partially schematic, partially block diagram of an embodiment of the present invention which receives video signals from a proximate location.

In a most basic embodiment of the system of the present invention, reference is made to FIG. 1, which shows switching circuitry 10 and connections thereto. Here, a plug 12 coupled to circuitry 10, and which may be a 65 terminal subminature "D" connector, is shown having terminals designated TTL/ANL, HS, VS, TTL1, TTL2, ANL, +5 V, and GND. The terminals designated TTL1, TTL2 and ANL are each actually three discrete terminals, which are each coupled to three separate conductors to and from circuitry 10, as indicated by the /3 designation. A dashed line 14 indicates an alternate embodiment wherein the three ANL conductors are coupled in parallel with the three respective TTL1 terminals, as will be further explained. As such, plug 12 contains at least 14 terminals, and 11 terminals in the alternate embodiment.

Plug 12 is adapted to be coupled to a mating plug 16 having mating terminals to at least some of the terminals of plug 12, and which in turn is coupled by a cable 17 to a source 18 of one of the types or classes of MDA, CGA, EGA, or VGA computer video signals, such as, but not limited to, a video port of a computer. Terminals are provided in plug 12 for carrying all the classes of video signals described, with the mating plug 16 coupled, with respect to video signals, and as shown in FIGS. 1a, 1b, and 1c, and 1d, to active terminal connections pertinent to only one class of video signal. As such, all that is required to convert from one class of video signal to another is to couple the appropriate plug of plugs 16a, 16b, and 16c, and 16d and its cable to plug 12, thereby changing the connections to the terminals of plug 12 and providing different types of video signals thereto.

The first source of video signals is an MDA source 2 (FIG. 1a), which provides MDA signals to the terminals of plug 12 via plug 16a and cable 17a. Here, the active terminals of plug 16a connect the identification signal TTL/ANL to the TTL/ANL terminal of plug 12, the video source signals VS (vertical sync) and HS (horizontal sync) to the VS and HS terminals of plug 12, the V (video) and I (intensity) signals to two of the TTL1 terminals, and ground and +5 volts to the ground and +5 volts terminals of plug 12. The potentials of +5 volts and ground provide power to the components of circuitry 10, as shown in FIG. 1, and may be provided by the signal source. In the instance where the signal source is a computer, these potentials may be taken from the keyboard port. Alternately, a separate power supply (not shown) may be provided to power the components of circuitry 10.

In the instance where the video signals are provided by a CGA source 4 (FIG. 1b), the active terminals of plug 16b connect the identification signal TTL/ANL to the TTL/ANL terminal of plug 12, the video source signals HS, VS, to the HS and VS terminals of plug 12, the primary red, green, and blue video signals to respective ones of the TTL1 terminals of plug 12, and the intensity signal (I) to a one of the TTL2 terminals of plug 12, and, of course, +5 VOLTS and GND.

An EGA video source 6 (FIG. 1c) provides the EGA signals from the active terminals of plug 16c connecting the identification signal TTL/ANL to the TTL/ANL terminal of plug 12, the VS and HS source signals to the VS and HS terminals of plug 12, the three primary EGA signals (PRI EGA) red, green, and blue coupled to the three TTL1 terminals of plug 12, the three secondary EGA signals (SEC EGA) red, green, and blue coupled to the TTL2 terminals of plug 12, and +5 volts and ground as described.

Likewise, a VGA signal source 8 provides VGA signals to a plug 16 (FIG. 1d) having active terminals providing the identification signal to the TTL/ANL terminal of plug 12, source signals HS, VS, to the respective HS and VS terminals of plug 12, the VGA signals red, green, and blue to the respective terminals of the three ANL terminals, and the VGA identification bits back to the source on the TTL2 terminals. The +5 VOLTS and GND are coupled as described, with the VGA red, green, and blue signal returns and sync returns being coupled to the single ground potential. As indicated, the identification signal line and terminals TTL/ANL are active during transmission of all four signal types, and used in conjunction with the variations of plug 16 and their various cables to configure and switch circuitry 10 appropriately to pass the applied video signals. The TTL/ANL signal is developed by coupling the identification terminal to a fixed logic potential, such as a HIGH Z logic potential or to a logic ground in the signal source, as indicated in FIGS. 1a, 1b, 1c, and 1d, depending on the type of video signal applied to plug 16.

In circuitry 10, (FIG. 1) the TTL/ANL signal line is coupled to a pullup resistor 22, which may be of about 10K ohms, and which is coupled to the source of power, such as +5 volts. As such, when a HIGH Z logic state is applied to the TTL/ANL terminal, resistor 22 serves to pull the HIGH Z state up to a HIGH logic potential. The signal lines TTL1 and TTL2, which are each three discrete signal lines, are each coupled to the input of a respective discrete tristate buffer of buffers 20, each having an enabling, active HIGH input EN, which is coupled to resistor 22 and line TTL/ANL. The outputs of the TTL buffers are coupled to provide the signals applied to lines TTL1 and TTL2 as outputs TTL1 and TTL2, which in the instance of video signals, may be coupled to an appropriate TTL monitor, or to video input ports of a keyboard, video, and mouse switch.

Likewise, the analog buffers 26 are three discrete analog buffers having inputs coupled to terminals ANL, and which are enabled by an active HIGH, enabling input EN. The outputs of buffers 26 are also provided as outputs. An inverter 24 serves to invert the signal from resistor 22, insuring that buffers 20 and 26 are enabled on a mutually exclusive basis. The horizontal and vertical sync signals of all the described video types are TTL signals, and are passed through circuitry 10 unchanged. A network 74 serves to provide selected logic states to the TTL2 terminals of plug 12, as will be further explained.

The MDA signals from MDA source 2 (FIG. 1a) are coupled via plug 12 to circuitry 10 (FIG. 1), with the VS and HS signals of plug 16 coupled to corresponding terminals of plug 12, and passed unchanged as described as outputs. The V and I signals are coupled to a respective one of the TTL1 terminals and conductors, with the GND terminals coupled to logic ground and the +5 volts coupled to provide power to the components of circuitry 10, also as described. The identification terminal TTL/ANL is coupled to a HIGH Z logic state designated HZ in FIG. 1b, in the source 2 of MDA signals. In circuitry 10, the HIGH Z logic state is pulled to a HIGH logic potential by a pullup resistor 22, which is applied to enable input EN of TTL buffers 20. Concurrently, this HIGH is applied to the input of inverter 24, which provides a disabling signal to the enabling input of analog buffers 26. Thus, the MDA intensity signal and video signal are provided by two of the TTL buffers 20 as outputs, as to an MDA monitor (not shown).

With respect to a CGA video signal source 4 (FIG. 1b), the CGA signals red, green, and blue of the terminals of plug 16 are applied to a respective one of the terminals of plug 12 designated TTL1, with the CGA intensity signal INT applied to a one of terminals TTL2 of plug 12. Thus, the three buffers of circuitry 10 coupled to the TTL1 signal lines are provided the TTL CGA red, green, and blue signals, respectively, with the intensity signal applied to one of the TTL buffers coupled to the TTL2 terminal. Here, a HIGH Z logic state (HZ) is again applied to the identification terminal TTL/ANL, which allows resistor 22 to develop a HIGH logic state, and apply this HIGH as an enabling signal to TTL buffers 20. This passes the CGA signals, providing them as an output. The HS and VS signals are passed as described unchanged. Power and ground reference potentials are applied from the CGA source.

When an EGA video source 6 (FIG. 1c) is coupled to plug 12, the TTL/ANL terminal is again provided with a high impedance, or HIGH Z logic state (HZ), enabling buffers 20 as described. The terminals HS and VS are provided with the horizontal sync signal and vertical sync signals, respectively, which are passed also as described. The primary TTL video signals red, green, and blue are applied to respective TTL1 terminals, and the secondary video signals red, green, and blue are applied to the respective terminals TTL2.

In this instance, and with the HIGH Z state applied to terminal TTL/ANL, pullup resistor 22 develops a HIGH logic potential, which in turn is applied to the enabling input EN of TTL buffers 20. This enables buffers 20 to pass the video signals primary red, green, and blue, and the secondary video signals red, green, and blue to output terminals of plug 27.

Where analog VGA video signals are applied from a VGA source 8 (FIG. 1d) to plug 12, the TTL/ANL terminal receives a grounded, or LOW logic potential. The horizontal sync and vertical sync signals are applied to terminals HS and VS, respectively, and passed as described, and the analog VGA video signals red, green, and blue are applied to the respective terminals of the ANL terminals discretely coupled to the three analog buffers. Here, the LOW applied to the TTL/ANL terminal pulls the potential from resistor 22 to a LOW logic state, and applies this LOW as a disabling signal to the enabling input EN of TTL buffers 20. Concurrently, inverter 24 develops a HIGH from the LOW applied to the TTL/ANL terminal and applies this HIGH logic potential to the enabling input of analog buffers 26, enabling the VGA video signals to be passed as an output. Additionally, the VGA ID bits, which indicate whether the monitor is a high resolution color, regular color, or monochrome, are provided back to the video source on the TTL2 terminals.

The potentials of these ID bits are developed by network 74 comprising active LOW tristate buffers 28, 30, and 32, which are enabled by the LOW from the TTL/ANL terminal.

The inputs of each of these inverters are coupled as shown to a one of pullup resistors 34, 36, and 38, and to a one of single pole single throw switches 40, 42, and 44, with one unswitched terminal of each coupled to ground. Thus, when enabled, inverters 28, 30 and 32 each provide a LOW or HIGH logic potential to a one of the TTL2 terminals depending on the switch position, which in turn is coupled to the ID bit input of the VGA video sending device to identify the monitor type. Ideally, the switches 40, 42, and 44 would be conveniently located so as to provide access thereto from the exterior of the enclosure within which the circuitry of FIG. 1 is located.

Alternately, the VGA signals red, green, and blue applied to analog buffers 26 may share the TTL2 terminals and conductors of plugs 12 and 16 due to the fact that the TTL and analog buffers are enabled on a mutually exclusive basis. This may be accomplished simply by coupling the inputs to the analog buffers in parallel with the TTL2 terminals carrying the EGA red, green, and blue signals, and providing a grounded logic state to the TTL/ANL terminal to disable the TTL buffers, and enable the analog buffers via inverter 24. In this instance, plug 16 and cable 17 may be the same for all the described video types, with cable 17 having at least as many conductors as needed to carry the video signal type having the most discrete signals, in this case the VGA signals. A VGA plug would be provided to terminate cable 17d at the source, and which mates with the described VGA connector thereof. Adapters would be provided to couple between the other types of signal sources and the VGA plug to couple the other type signals to the appropriate conductors. Further, the TTL/ANL terminal may be coupled to a conveniently accessible single pole single throw switch coupled to the TTL/ANL identification line and having one pole coupled to ground, and the other pole remaining disconnected or otherwise connected to a HIGH Z state in order to develop the HIGH Z and grounded logic potentials to enable the respective TTL and ANL buffers, respectively.

Figure 2:
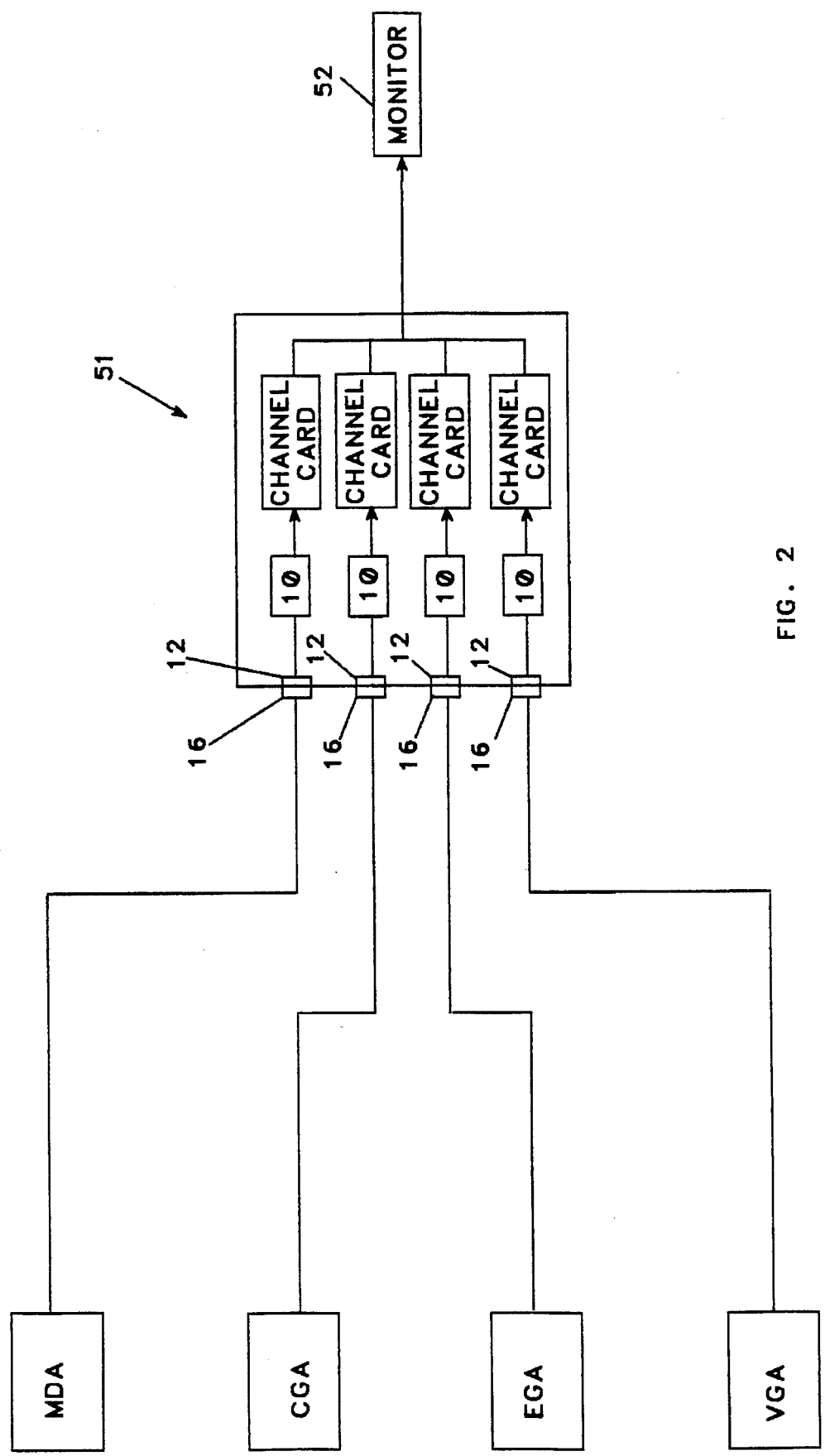
FIG. 2 is an illustration of one use of the present invention.

Use of the device of FIG. 1 may be as illustrated in FIG. 2. Here, the switching circuitry of FIG. 10 is coupled by plugs 12 and 16 to a MDA, CGA, EGA, or VGA video signal source as described, and then coupled by switching circuitry such as the COMMANDER video and keyboard switch. Switch 51 receives at least a plurality of diverse classes of video signals as inputs, and provides one of these classes of video signals as an output to a monitor. In this instance, all that is required to reconfigure a channel card for a different class of video signals is to connect the appropriate cable and connector 16 between the terminals of the connector 12 of the channel card, which is accessible on the exterior of the COMMANDER unit, and the video source.

In addition to the foregoing, modified circuitry of the switching circuitry of FIG. 1 may be used with extended communications links such as the EXTENDER, manufactured by CYBEX Corporation, of Huntsville, Ala. In this application, and as shown in the modified circuitry 10a of FIG. 3, an additional signal line and terminal designated SNDR/RKMT is coupled to plugs 16 and 12, respectively. Signals on this line are developed as shown in FIGS. 1e and 1f by the signal source. Here, when the TTL or analog signals originate from a location proximate switching circuit 10a, the SNDR/RKMT terminal is coupled to a HIGH Z logic state (FIG. 1e). When the analog or TTL signals originate from a remote signal conditioning circuitry, the SNDR/RKMT terminal is coupled to a HIGH logic potential (FIG. 1f). Alternately, a conveniently located single pole, single throw switch may be coupled to the identification line SNDR/RKMT, the switch having one switched terminal coupled to the HIGH Z logic state and the other switched terminal coupled to a HIGH logic potential, thus providing these potentials to circuitry 10a. Also, analog signal conditioning circuitry 54, such as the VGA extended communications link signal conditioning circuitry as disclosed in allowed U.S. patent application Ser. No. 07/488,710, and which is incorporated herein by reference, is coupled in parallel with analog buffers 26. This circuitry terminates the signal line with a load to ground and uses an emitter follower circuit with precompensation to modulate current flow on the signal line. Analog buffers B similar to buffers 26 are diagrammatically shown as being coupled to receive the analog red, green, and blue VGA video signals after being conditioned by signal conditioning circuitry 54, and are enabled by a HIGH logic signal applied to an active HIGH enabling input EN. The analog buffers 26 and signal conditioning circuitry 54 are coupled as shown to the ANL terminals of plug 12, in turn coupled to the VGA terminals of plug 16 carrying conditioned analog VGA red, green, and blue signals from a remote analog sending signal conditioning circuit 56 as described in the referenced patent. In the instance where the analog VGA signals originate from a local location 58, conductors connect the analog signals to plug 16 as described in the foregoing.

Figure 3:
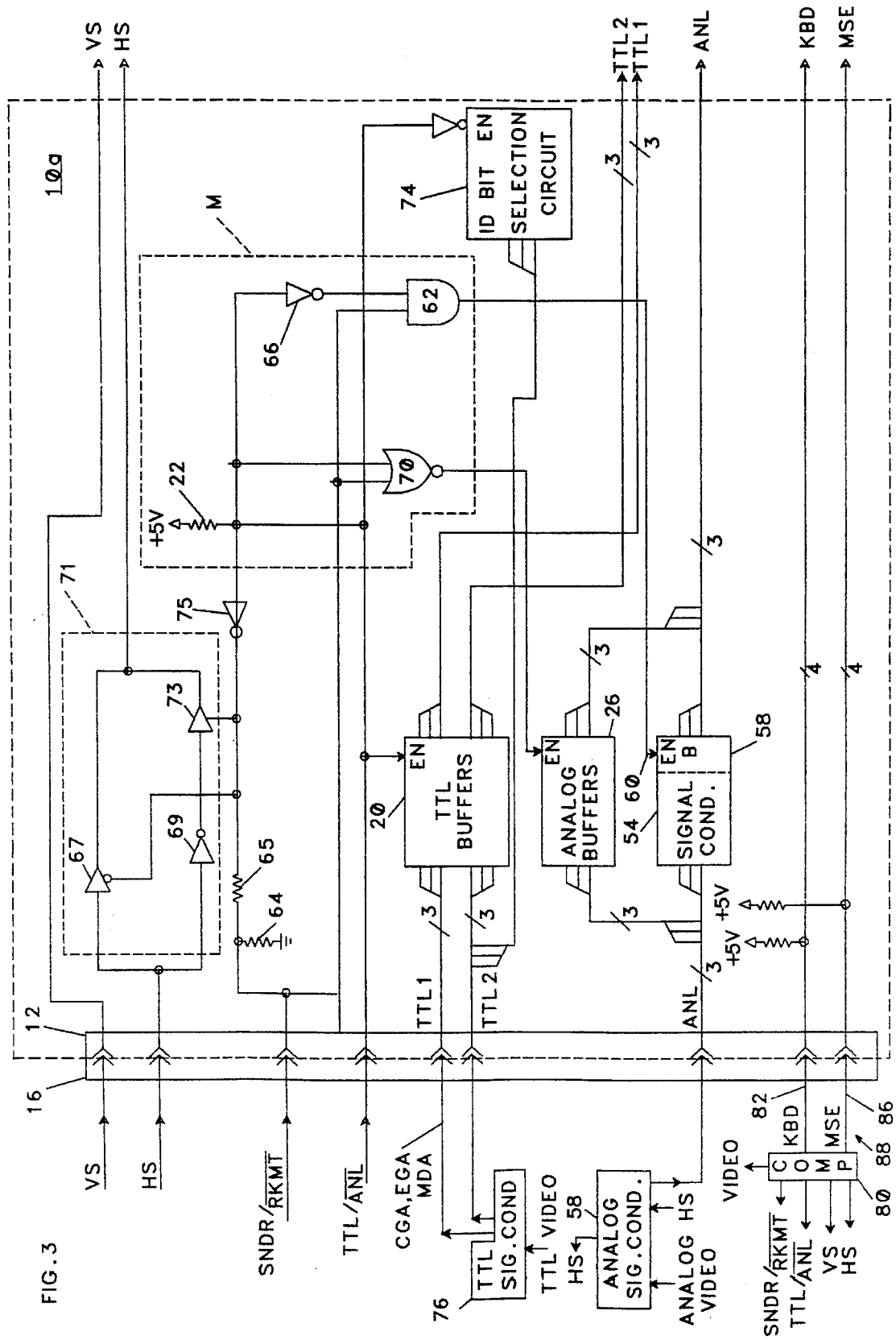
FIG. 3 is a partially schematic, partially block diagram of an embodiment of the present invention which receives video signals from remote signal conditioning circuitry and from a proximate source of video signals.

The circuitry of FIG. 1 is further modified as shown in FIG. 3 by providing combinatorial logic, as indicated by dashed line enclosure M. In a preferred embodiment, the functions of the components inside enclosure M are implemented by software applied to a microprocessor, as is well understood by those skilled in the art. As these functions may be performed in any number of ways, it is to be understood that this invention is not to be limited by the mere combinatorial logic components in enclosure M, although alternately, combinatorial components may be used as shown to perform the functions provided by these components. This logic serves to automatically enable conditioning of the signals applied to terminal 12, if needed, and to switch and provide the signals as an output.

Additionally, as described in the referenced patent application, where VGA signals are provided from remote signal conditioning circuits, the HS (horizontal sync) signals are reduced in amplitude and inverted so as to prevent interference with the video signals. For reinverting the sync signals so they may be applied to a monitor, network 71 is provided to reinvert and restore the HS signals to their original levels. When the HS signals are received from a proximate location coupled only by conductors between the source and plug 12, they are buffered by network 71 and passed without inversion.

Network 71 receives the HS signals and applies them to the inputs of tristate buffer 67, which has an active LOW enabling input, and inverter 69. Inverter 69, in the manufactured product, is a NAND gate having both inputs coupled to the HS signal, and which functions as an inverter, but for convenience, component 69 is illustrated as an inverter. The output of inverter 69 is coupled to tristate buffer 73 having an active HIGH enabling input, with the outputs of buffers 67 and 73 coupled together to provide the HS signal as an output. Buffers 67 and 73 are enabled on a mutually exclusive basis to pass either an inverted and restored HS signal when the HS signal is received from a VGA remote signal conditioning circuit, or to pass the HS signal uninverted from a local source. Network 71 is responsive to open collector inverter 75, which when HIGH, does not provide a HIGH logic potential, but provides a HIGH Z logic state. When LOW, inverter 75 sinks current in the output thereof, pulling a HIGH logic potential to a LOW logic state. Additionally, network 71 is responsive to a logic state applied to the SNDR/RKMT terminal, which is applied across a pulldown resistor 64 coupled to ground, and which may be about 10K ohms, and through a series pullup resistor 65, which may be about 4.7K ohms. Coupled as such, when a HIGH logic state is applied to terminal SNDR/RKMT, and a LOW is applied to terminal TTL/ANL, as when the VGA signal is received from a remote signal conditioning circuit, the HIGH is passed through resistor 65 and developed by the HIGH Z impedance of the open collector input of inverter 75, enabling buffer 73 to pass the HS signal through inverter 69, inverting and restoring the HS signal, as an output. In all other cases, inverter 75 is driven to a LOW logic state, disabling buffer 73 and enabling buffer 67 to pass the uninverted HS signal as an output.

The combinatorial logic in enclosure M comprises pullup resistor 22, which is also shown in FIG. 1, the functions of enclosure M also incorporating the function of inverter 24 of FIG. 1. Pullup resistor 22 is coupled to a source of HIGH logic potential and to the TTL/ANL terminal of plug 12, and provides a HIGH logic state when a HIGH Z logic potential is applied to terminal TTL/ANL, and a LOW logic potential when a LOW is applied to terminal TTL/ANL. The signal from resistor 22 and terminal TTL/ANL is applied to one input of NOR gate 70 and to the input of inverter 66, which in turn provides an inverted signal to one input of AND gate 62. The other input of AND gate 62 is coupled to terminal SNDR/RKMT and to pulldown resistor 64, so that when a HIGH Z logic state is applied to terminal SNDR/RKMT, pulldown resistor 64 insures a LOW logic potential is applied to the other input of AND gate 62 and the other input of NOR gate 70. When a HIGH logic state is applied to terminal SNDR/RKMT, this HIGH is applied to AND gate 62 and NOR gate 70.

As stated, the SNDR/RKMT terminal is provided with a HIGH Z logic state when analog VGA signals originate from a source proximate circuitry 10a (FIG. 1e). This potential from the SNDR/RKMT terminal is applied to one input of AND gate 62 and to pulldown resistor 64, which is coupled to a LOW logic potential such as signal ground, pulling the HIGH Z potential LOW and disabling AND gate 62. This in turn causes AND gate 62 to provide a LOW to the enabling input EN of buffers 58, disabling these buffers and preventing signals from being passed by signal conditioning circuit 54. Concurrently, the LOW developed by resistor 64 is applied to one input of NOR gate 70. Additionally, the TTL/ANL terminal is provided with a LOW logic potential as described, which pulls the HIGH potential from resistor 22 to a LOW logic state. This LOW is applied to the other input of NOR gate 70, which together with the LOW on the SNDR/RKMT terminal developed by resistor 64, enables NOR gate 70 to develop a HIGH output. This HIGH is applied to the enabling input EN of analog buffers 26, allowing them to pass the analog signals from the proximate location as an output. Additionally, the LOW applied to the TTL/ANL terminal is applied to the enable terminal EN of the buffers of networks 74, enabling them to pass the data set by switches 40, 42, and 44 back to the source, as described above. Also, the LOW from terminal TTL/ANL is applied to the input of open collector inverter 75, causing it to develop a HIGH Z output. As the SNDR/RKMT terminal is at a HIGH Z state, resistor 64 pulls the input of buffers 67 and 73 LOW via resistor 65, enabling buffer 67 to pass the uninverted HS signal as an output. The TTL buffers 20 are inhibited by the LOW applied to the TTL/ANL terminal as described for FIG. 1.

Where the analog signals originate from a remote analog signal conditioning circuit 56, the SNDR/RKMT terminal is provided with a HIGH logic potential, which is applied to one input of AND gate 62, with the other input coupled to the output of inverter 66. The input of inverter 66 is coupled to pullup resistor 22 and to the TTL/ANL terminal, which in this case provides a LOW logic potential, pulling the HIGH from resistor 22 to a LOW. This LOW is inverted by inverter 66 to a HIGH, which enables AND gate 62 to provide an enabling signal to the enabling input EN of buffers 58, passing the conditioned analog signals as an output. The HIGH applied to terminal SNDR/RKMT is also applied to NOR gate 70, inhibiting gate 70 which provides a disabling signal to the enable input EN of buffers 26. The TTL buffers are inhibited by the LOW applied to the TTL/ANL terminal, which LOW also applied to the enabling input EN of network 74 as described, passing the switch data to the TTL2 terminals of plug 12. The LOW from the TTL/ANL terminal causes open collector inverter 75 to develop a HIGH Z logic state, which in turn allows the HIGH from the SNDR/RKMT terminal to be developed via resistor 65 and applied to the inputs of buffers 67 and 73. This enables buffer 73, passing the inverted and reconstructed HS signal from inverter 69 as an output.

Where TTL video signals are applied to the TTL1 and TTL2 terminals of plug 12 to circuitry 10a from a remote signal conditioning circuit 76, as described in U.S. Pat. No. 5,193,200, and which is also incorporated herein by reference, the TTL buffers 20 are of the type described in the referenced patent in order to effect reconstruction of the video signals transmitted over the extended link. Here, the TTL signals originating from the link as described in the referenced patent are applied to terminals TTL1 and TTL2, with the SNDR/RKMT terminal having a HIGH logic potential applied thereto, and a HIGH Z logic state applied to the TTL/ANL terminal. In this instance, the HIGH Z logic state from the TTL/ANL terminal is pulled HIGH by resistor 22, enabling the TTL buffers 20 to pass the primary and secondary signals as an output. This HIGH is also applied to the enabling input EN of network 74, disabling this network. Additionally, the HIGH potential applied to the SNDR/RKMT terminal is applied to one input of NOR gate 70, which in turn provides a disabling output to the enabling input EN of analog buffers 26. The HIGH Z logic state from terminal TTL/ANL is pulled to a HIGH logic state by resistor 22, which HIGH being inverted by inverter 66 to develop a LOW logic state, which is applied to AND gate 62, disabling gate 62 and providing a LOW to the enabling input EN of analog buffers 26. The HIGH developed by resistor 22 is applied to the input of open collector inverter 75, which develops a LOW output, pulling the HIGH from the SNDR/RKMT terminal via resistor 65 to a LOW logic state, which is applied to the enable inputs of buffers 67 and 73. This enables buffer 67 to pass the uninverted HS signal.

When TTL signals are applied to terminals TTL1 and TTL2 from a location proximate circuitry 10a, a HIGH Z logic state is applied to the SNDR/RKMT terminal and to the TTL/ANL terminal. Here, the HIGH Z state on the TTL/ANL terminal is pulled HIGH by resistor 22, which HIGH being applied to the enable input EN of TTL buffers 20, enabling these buffers to pass the TTL signals. This HIGH is also applied to the enable input EN of network 74, disabling these buffers and preventing conflicting data from being applied to the TTL2 terminals. The HIGH from resistor 22 is also applied to the input of inverter 66, which develops a LOW, this LOW being applied to one input of AND gate 62 to disable gate 62 and provide a disabling LOW to the enable input EN of analog buffers 58. The HIGH from resistor 22 is also applied to one input of NOR gate 70, disabling gate 70 to develop a LOW logic state, which is applied as a disabling signal to the enable input EN of buffers 26. For the HS signal, the HIGH developed by resistor 22 is applied to the input of open collector inverter 75, which develops a LOW output and provides this LOW to the enable inputs of buffers 67 and 73. This enables buffer 67, passing the HS signal without inversion as an output.

In the instance where the video sources of the video signals include at least transmission of computer keyboard signals, and possibly signals from a serial device such as a "mouse", as in a computer, provisions may be made to transmit the keyboard and mouse signals to and from a computer 80, as shown in FIG. 3. Here, keyboard signals CLOCK, DATA, POWER and GROUND may be applied to and from conductors of a keyboard cable 82 conventionally terminating at one end in a "D" connector plug fitted to the keyboard port of a computer, with the other ends of the keyboard conductors terminating at keyboard terminals in plug 16. The keyboard signals and potentials are passed by corresponding terminals in plug 12, designated as KBD and a/4 to indicate 4 conductors through circuitry 10a to a separate, discrete keyboard type DIN plug 84 having terminals which are coupled to terminals 86 of a keyboard plug coupled to the respective conductors of a keyboard cable. In accordance with the signal conditioning of the referenced patents, pullup resistor 92 may be coupled to the appropriate signal lines of the keyboard conductors as needed.

Likewise, the mouse signals CLOCK, DATA, POWER and GROUND are applied to conductors 88 that terminate at one end in a plug 90 fitted to the serial, or mouse, port of a computer, and which terminate at the other end in terminals of plug 16. These terminals in plug 16 couple to mating terminals in plug 12, which in turn are coupled to conductors designated MSE and /4 to indicate 4 conductors that carry the mouse signals to plug 92. Here also, appropriate pullup resistors are provided to the mouse signal lines as described in the referenced patents. Plug 92 is a discrete serial or mouse plug separate from the other plugs, and is adapted to connect to the plug 92 and respective terminals of a mouse or other serial device.

While the invention disclosed herein describes operation with respect to IBM™ PC class computers, other microcomputers may be operated in conjunction with this invention. Additionally, this invention may be used with other electronic devices where one of relatively little skill may quickly and conveniently couple one of several discrete sources of differing electrical signals to a device using these signals.

Having thus described our invention and the manner of its use, it is apparent that incidental changes may be made thereto that fairly fall within the scope of the following appended claims, wherein

We claim:

1. A selective video transmission system comprising:

a plurality of first communications links each including a plurality of source conductors, each of said first communications links uniquely couplable to an electrical interface of one of a plurality of computers each providing a different class of video signals, certain of said source conductors of each of said first links being dedicated to a discrete said class of video signals;

a second communications link connectable with said plurality of source conductors of said first communications link by and including discrete sets of conductors, each of said sets of conductors dedicated to transmission of a particular said class of video signals, for passing one of said classes of video signals along a discrete conductive path;

said system including indicating signal means for generating an indicating signal indicative of a said class of video signals coupled to said second communications link, and;

switching means coupled to said discrete sets of conductors of said second communications link and responsive to said indicating signal means, for passing said particular class of video signals coupled to said second communications link.

2. A system as set forth in claim 1 wherein said system includes identification signals generation means coupled to a one of said discrete sets of conductors, for generating identification signals when analog video signals are coupled to a different set of said first said sets of conductors, providing said identification signals to a computer of said plurality of computers.

3. A system as set forth in claim 2 wherein said switching means comprises a plurality of digital buffer amplifiers and a plurality of analog buffer amplifiers, said buffer amplifiers each having an enabling input, and said digital buffers being enabled to pass a digital signal as an output only when said analog buffers are disabled, and said analog buffers being enabled to pass an analog video signal as an output concurrently with said identification signal generation means being enabled to pass said identification signals to said computer.

4. A system as set forth in claim 1 wherein said classes of video signals includes the classes MDA, CGA, EGA, and VGA video signals.

5. A system as set forth in claim 1 wherein a conductor carrying said indicating signal is coupled to a fixed potential of a one of said computers.

6. A system as set forth in claim 1 wherein said first communications link further comprises:

remote signal conditioning circuitry coupled to said computer;

second indicating signal means for generating a second indicating signal indicative of a location of said computer, signal restoration and switching means coupled to a one of said conductive paths and responsive to said indicating signal and said second indicating signal, for restoring a video signal received from said remote signal conditioning circuitry.

7. A system as set forth in claim 1 wherein said system is coupled to a video switch having different classes of video signals as inputs.

8. A system as set forth in claim 1 wherein said switching system comprises at least one digital buffer amplifier and at least one analog buffer amplifier, said buffer amplifiers each having an enabling input, and said digital buffer amplifier being enabled to pass a digital signal as an output only when said analog buffer is disabled, said analog buffer being enabled to pass an analog video signal only when said digital buffer is disabled.

9. A computer signal coupling system comprising:

a plurality of identical video signal ports each receiving one of a plurality of classes of video signals including analog and digital classes of video signals, each said port having first conductive paths for digital video signals and second conductive paths for analog video signals, a first conductor in each of said plurality of ports and couplable to one of a plurality of fixed logic states indicative of a class of video signals coupled to a respective said port, a plurality of digital buffer amplifiers each responsive to a first logic state on said first conductor and having an input coupled to a one of said first conductive paths for receiving digital video signals, for providing output digital video signals, a second conductor in each of said plurality of ports and couplable to one of a plurality of fixed logic states each indicative of location of a source of said digital and analog video signals, a plurality of analog buffer amplifiers each responsive to a second logic state on said first conductor and a first logic state on said second conductor and having an input coupled to a one of said second conductive paths for receiving said analog video signals, for providing output analog video signals, analog signal conditioning and buffer circuitry coupled to said second conductive paths for receiving said analog video signals from a remote location, and responsive to said second logic state on said first conductor and a second logic state on said second conductor, for conditioning and passing said analog video signals received from a remote location.

10. A system as set forth in claim 9 wherein said analog video signals received from a remote location are received from remote signal conditioning circuitry in turn coupled to an analog video port of a remote computer.

11. A system as set forth in claim 10 further comprising:

an inverter having an input coupled to an HS signal of said analog video signals received from a remote location, and an output, a buffer amplifier having an input coupled to said output of said inverter, and responsive to said second logic state on said first conductor and said second logic state on said second conductor, for inverting and restoring said HS signal and providing an inverted and restored HS signal as an output.

12. A system as set forth in claim 9 wherein a one of said plurality of classes of video signals is coupled via said first or second conductive paths to a video monitor.

13. A system as set forth in claim 9 wherein said first conductive paths are couplable to identification signal inputs of an analog video port of a computer, and further comprising an analog video identification signal generator responsive to said second logic state on said first conductor, and having an output coupled to said first conductive paths, for providing analog video identification signals to said computer.

* * * * *